(No Model.)  5 Sheets—Sheet 1.

H. MARSHALL.
FARE RECORDER AND REGISTER.

No. 334,534. Patented Jan. 19, 1886.

Attest:
Court A. Cooper

Holmes Marshall
Inventor
By his Attorneys
Edson Bros.

(No Model.) 5 Sheets—Sheet 2.

H. MARSHALL.
FARE RECORDER AND REGISTER.

No. 334,534. Patented Jan. 19, 1886.

Attest:
Court A. Cooper.
W. J. Bernhard

Holmes Marshall
Inventor
By his Attorneys
Edson Bros.

(No Model.)  5 Sheets—Sheet 3.
H. MARSHALL.
FARE RECORDER AND REGISTER.
No. 334,534.  Patented Jan. 19, 1886.
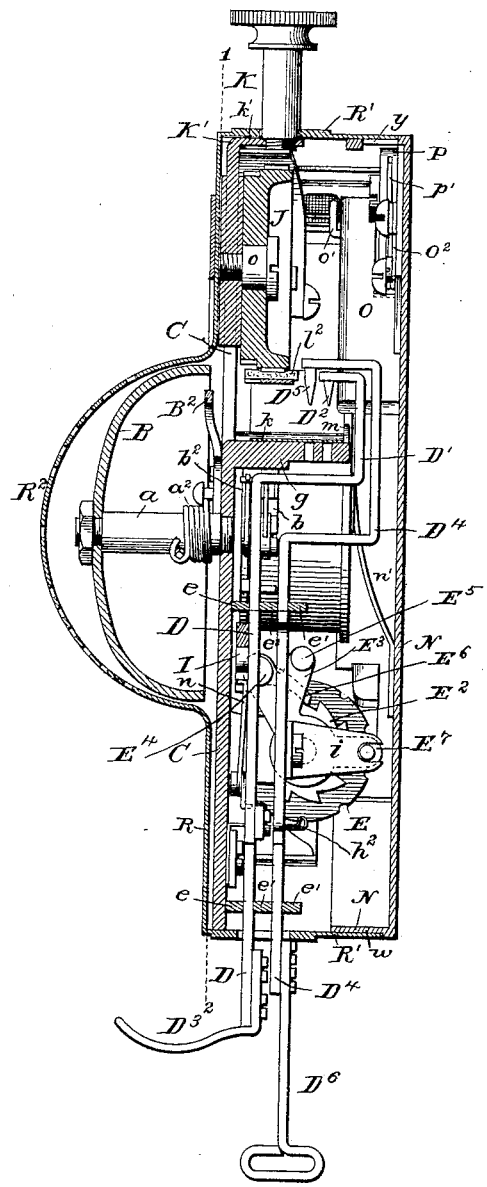
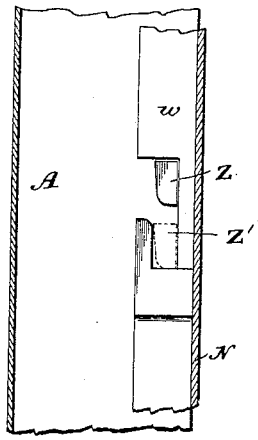
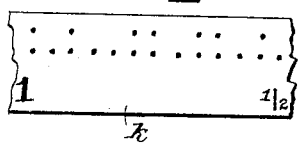
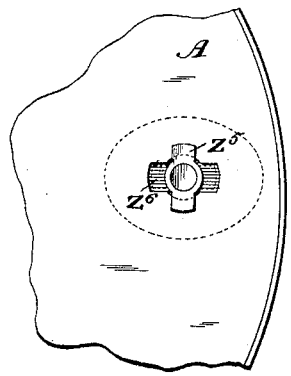
Attest:
Cont A Cooper
H. T. Perchart
Holmes Marshall
Inventor
By his Attorneys
Edson Bro's
N. PETERS. Photo-Lithographer, Washington, D. C.

(No Model.)  H. MARSHALL.  5 Sheets—Sheet 4.
FARE RECORDER AND REGISTER.
No. 334,534.  Patented Jan. 19, 1886.

(No Model.) 5 Sheets—Sheet 5.
H. MARSHALL.
FARE RECORDER AND REGISTER.
No. 334,534. Patented Jan. 19, 1886.
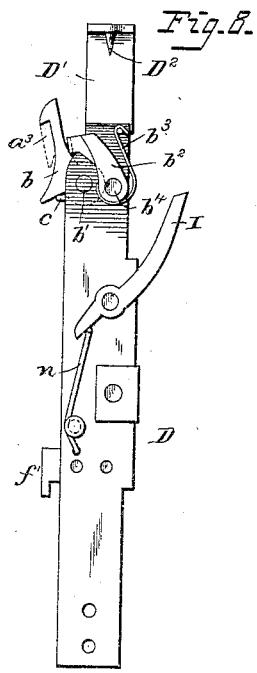
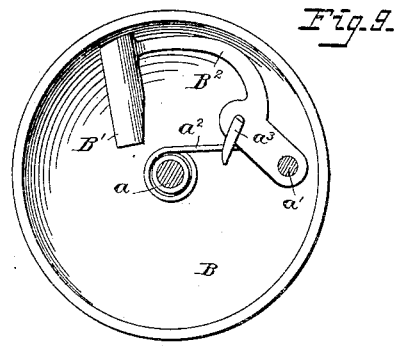
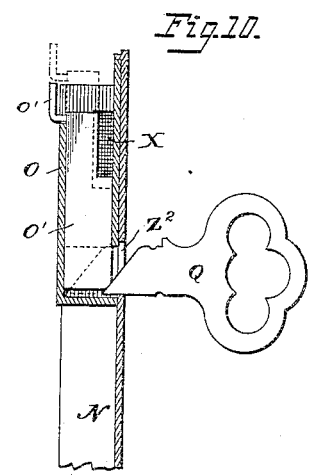
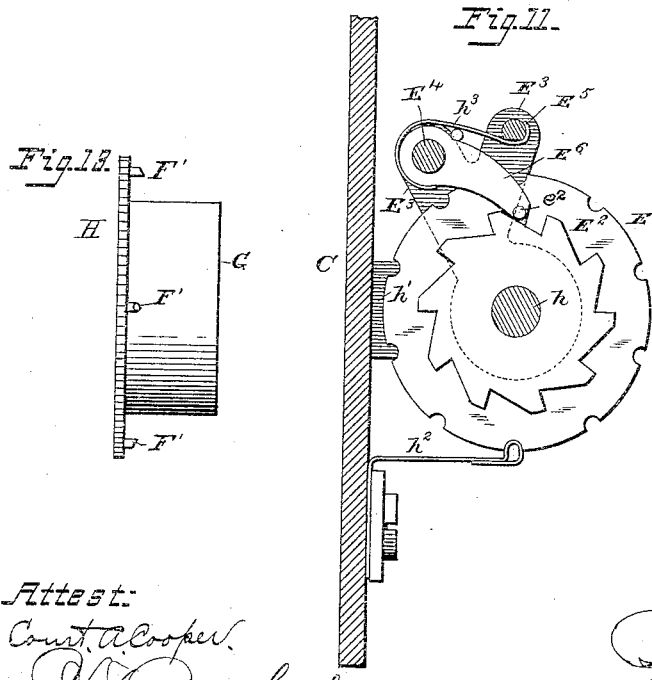
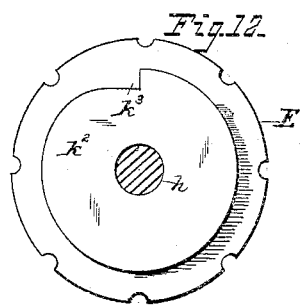
Attest:
Const. A. Cooper.
W. Bernhard
Holmes Marshall
Inventor
By his Attorney
Edson Bros.

United States Patent Office.

HOLMES MARSHALL, OF CLEVELAND, OHIO.

FARE RECORDER AND REGISTER.

SPECIFICATION forming part of Letters Patent No. 334,534, dated January 19, 1886.

Application filed November 1, 1884. Serial No. 147,021. (No model.)

*To all whom it may concern:*

Be it known that I, HOLMES MARSHALL, a citizen of the United States, residing at Cleveland, in the county of Cuyahoga and State of Ohio, have invented certain new and useful Improvements in Fare Registers and Recorders, of which the following is a specification, reference being had therein to the accompanying drawings.
This invention contemplates improvements upon my fare recording and registering apparatus forming the subject-matter of Letters Patent granted to me March 25, 1884, and numbered 295,781.
Said improvements have for their object, principally, to effect the fare recording or puncturing operation by the action of a single puncturing-bar for one class of fares—as, for instance, "cash"—and the coaction of two or more puncturing-bars for a second and third class of fares, as tickets and tranfers, and to divide or point off the recorded fares into groups of ten, while another object is to prevent tampering with the recording mechanism without detection.

To these ends the invention consists of the parts combined and constructed substantially as hereinafter described and claimed.

Figure 1:
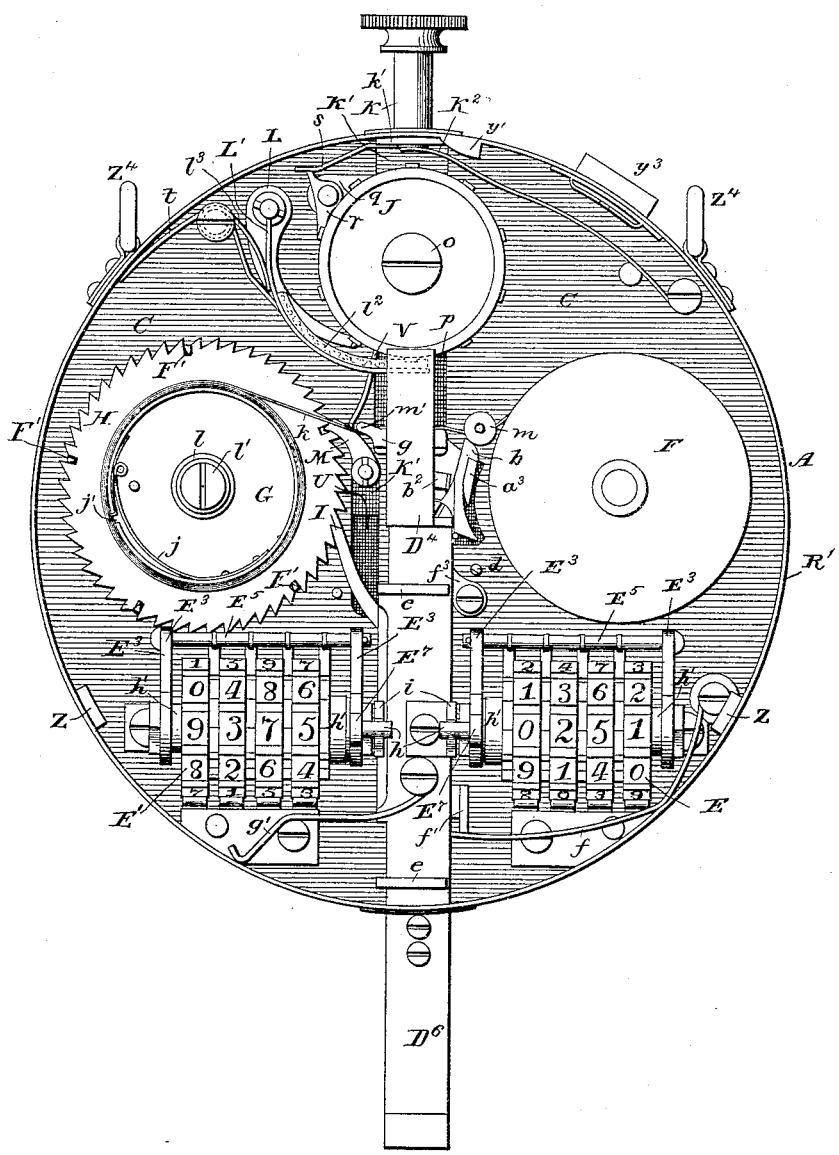
Figure 2:
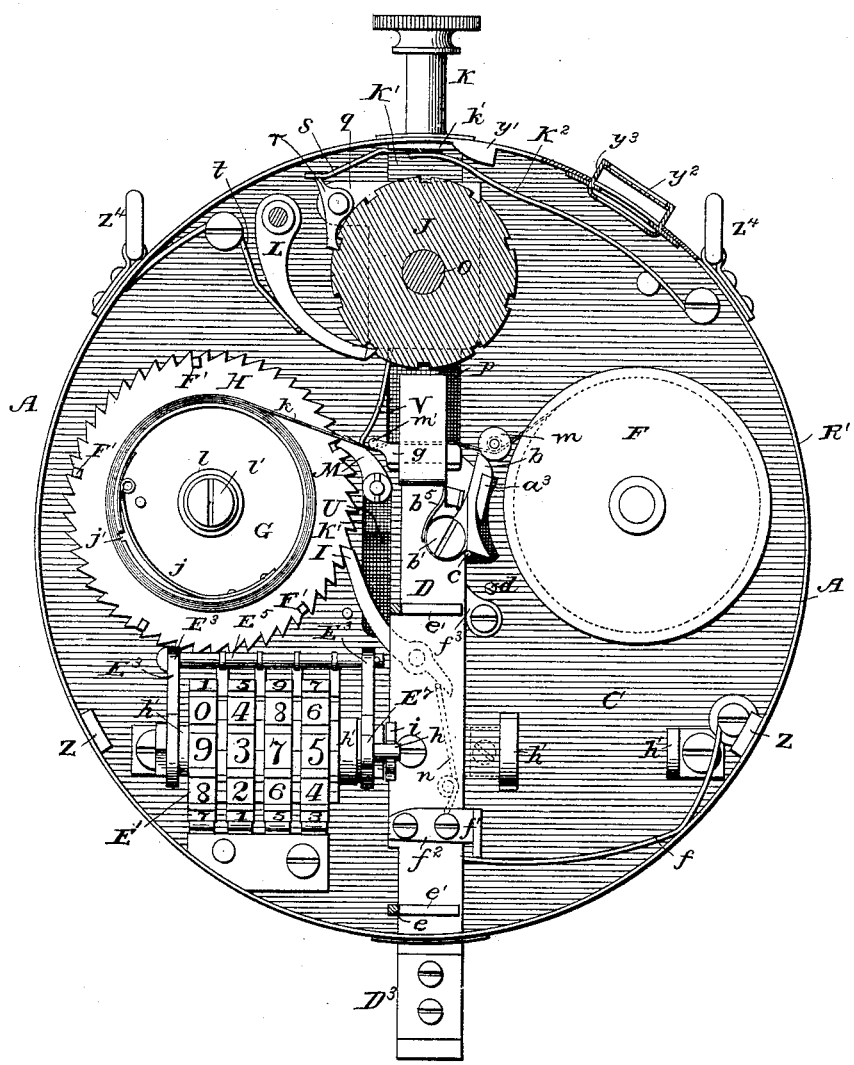
Figure 4:
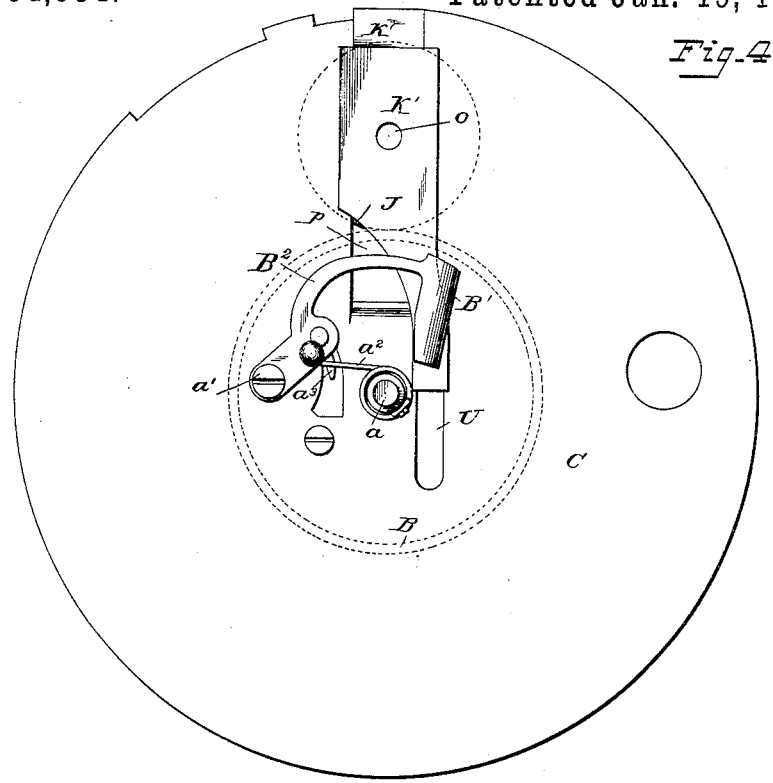
Figure 5:
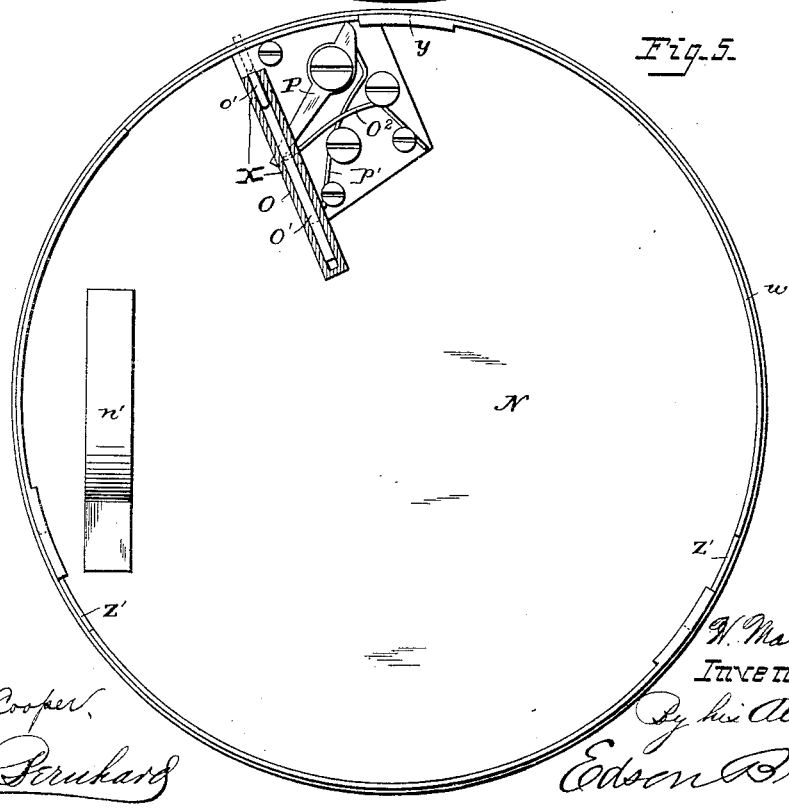

In the accompanying drawings, Figure 1 is a view in side elevation of my improved fare recorder and register with the back plate or cover of the containing-case removed, exposing the internal operative mechanism, except the gong and its hammer. Fig. 2 is a similar view thereof with one series of decimal-wheels or registering-disks omitted, and the trip or half-trip recording-wheel taken in section. Fig. 3 is a transverse sectional elevation of the same with the back plate or cover in place.
Fig. 3ª shows a section of a punctured and printed slip. Fig. 4 is a view taken outside of the internal supporting-plate and between it and the gong or bell on line 1 2 of Fig. 3, showing, however, the bell or gong hammer, also a portion of the trip or half-trip recording-wheel, the position or relation of the gong or bell being indicated in dotted or hatchel lines. Fig. 5 is an interior view of the back plate or cover. Fig. 6 is a detailed sectional view showing partially the means for attaching the back plate or cover to the containing case or shell. Fig. 7 is a detailed broken-off view showing a means for detachably connecting a designating number (not shown) upon the face of the case or shell. Fig. 8 is a detail view of one of the fare puncturing or recording bars, exposing its adjunctive parts. Fig. 9 is a similar view of the gong or bell, looking interiorly. Fig. 10 is a sectional view taken through the case and its cover or back plate, with parts broken away, showing the lock with its key partially inserted. Fig. 11 is a detail of one of the decimal-wheels or registering-disks, its ratchet, and the actuating-pawl of said ratchet, together with the holding-spring of said wheel, a section of the containing-case also broken off being also shown; and Figs. 12 and 13 are detail views.

In the embodiment of these improvements I employ a circular case or shell, A, which is unlike that of the aforesaid patent, not only as to its shape, but as regards the application thereto of the gong or bell B. The latter is connected to a plate, C, secured by screws upon the inside of the case A, said connection of the gong or bell to said plate being effected by a screw-threaded stud, $a$, with one end secured by a nut to said gong and the other end fixed to said plate. The hammer B' in the present instance is arranged interiorly of the gong, said hammer having connection with a pivot, $a'$, upon the plate C by an arm, B². To this arm is connected a strong spring, $a^2$, coiled around the stud $a$, by the recoil action of which spring, when said hammer is actuated, as hereinafter explained, said hammer is caused to strike the bell or gong, calling attention to the recording of the fare, which will be also explained further on. Upon this arm B² is also a cam-projection, $a^3$, which, instead of being actuated, as in my previous patent, by one of the decimal-wheel ratchets to trip the hammer in sounding the bell or gong, is engaged by a pawl, $b$, pivoted to the bar D at $b'$, which pawl is in turn acted upon by a supplementary bent pawl, $b^2$, pressed by a spring, $b^3$, which, together with said pawl, is connected to the bar D at $b^4$. Said supplementary pawl and spring serve to hold the primary pawl $b$ in engagement with said cam-projection $a^3$, which projects through an elongated aperture in the plate C and describes the arc of a circle in its movement therein as it is carried downward by the action of the pawl $b$, actuated by the bar D. The lower end of said pawl is slightly inclined upon its lower side downwardly and outwardly relatively to said bar, and to said bar is connected a pin, $c$, which serves as a stop for the inner edge of said pawl, to limit its movement as against the action of the spring and supplementary pawl after its release or disengagement from said cam-projection. To disengage the pawl $b$ from the cam-projection when the bar has reached the limit of its inward movement, I secure to the plate C a notched projection or stud, $d$, so as to have contact with the outer lower end of said pawl just a little before the latter has reached its lowest position, which stop or stud $d$ will trip the pawl or throw its upper end inwardly and release said cam-projection, allowing the recoil action of the spring $a^2$, as before stated, to cause the hammer to strike and sound the gong or bell.

The bar D is disposed about centrally within the case or shell A, and upon and between keepers $e\ e$, secured to the plate C, and open at one side to permit the ready insertion and removal of said bar. The bar is held as against lateral movement at the open side of the said keepers by means of the stop $f^3$, secured by screws to the plate C. This bar is exposed to the action of a spring, $f$, suitably secured upon the plate C at one end and bearing at its other end upon a short upright or projection, $f'$, of a plate, $f^2$, fastened to said bar near its outer or lower end, the action of which spring is to return said bar, after the release thereof, to its previous position. The inner end of said bar is formed with a bend, D', whose free end is provided with a pointed tooth or puncturer, D², to record one class of fares—as, for instance, cash—which tooth overhangs a perforated table, $g$, formed, it may be, by slitting and bending a portion of the plate C at right angles with itself, which may also be thickened or re-enforced upon its under side. To the outer end of bar D is connected a finger-piece or handle, D³, for its convenient operation.

D⁴ is a second bar, the duplicate in construction of the bar D, but being in size sufficiently larger than the latter to enable its overhanging tooth D⁵, somewhat longer than the tooth D² of the bar D, to also act upon or puncture the same slip or ribbon of paper which the latter tooth is designed to puncture and simultaneously therewith (as more fully explained presently) to record another class of fares—as, for instance, tickets. The bar D⁴, overhanging the bar D, causes said bar D to coact with the bar D⁴. The bar D⁴ is disposed to slide or act directly over the bar D, and is held in place and intact with said bar by additional arms $e'$, formed upon keepers $e$ of the bar D. The bar D⁴ is also provided with a finger-piece or handle, D⁶, which is rigidly secured thereto by screws or otherwise. A spring, $g'$, serves to return the bar D⁴ to its normal or original position. A third similar bar with the same adjustment of parts, it is obvious, can be used to record transfers.

E E' are two series of decimal-wheels or registering-disks, each series of which is mounted upon a common shaft or axis, $h$, bearing in supports or posts $h'$, fastened to the plate C. Each decimal-wheel of each series, while being held as against unnecessary movement, is caused by a spring, $h^2$, fastened to the plate C, to have the requisite amount of movement each time said wheel is operated. Each wheel has a ratchet, E², whose teeth are arranged at regular intervals apart, said ratchet being disposed upon one side of said wheel. Upon the other side of each of such wheels, and fastened thereto, is a cam-plate, $k^2$, with a single depression, $k^3$. Said cam or plate is of the same diameter as the ratchet-disk, including its teeth, save of course where it is provided with the depression. Upon one side of each of the pawls E⁶, Fig. 11, is a pin or post, $e^2$, projecting over and resting upon said plate, and each time said depression arrives opposite said post it allows the pawl E⁶ to drop and catch in the ratchet of the next wheel. Thus it will be seen that when the first or unit wheel of each series has made one revolution the depression of the plate on its inner side allows the next pawl to drop and catch in said ratchet, and upon the next movement of the lever the two adjoining wheels of each series are moved at the same time, and so on until all the wheels have assumed a position wherein the figures 9 9 9 thereon will be in line, when all four wheels will be moved simultaneously upon the next downward movement of the lever. These features, however, form no part of my invention. Upon each shaft $h$ are also supported two forked or bifurcated arms, E³, being held thereon by nuts, and one disposed at each end of the series of decimal-wheels and outside of the posts or supports $h'$. Said arms bear two rods, E⁴ E⁵, one being secured at its ends in one of the branches or prongs of each arm, while the other rod is secured in the remaining branches or prongs of each of said arms. One rod, E⁴, carries the series of pawls E⁶ for engagement with the ratchets E² of the decimal-wheels E, and the other rod, E⁵, holds the free ends of the pawl-springs $h^3$ as against springing off or away from the pawls. The inner arms, E³, sustaining the shafts of the two series of decimal-wheels, are each provided with a third branch or crank, E⁷, which cranks are disposed at nearly right angles to said arms, and have trunnions or studs entering recessed posts or arms $i$, one of which is fixed to the bar D, and the other one is fixed to the bar D⁴, whereby the action of the puncturer or recorder of one bar will be noted by one series of the decimal-wheels, and the action of the puncturer or recorder of the other bar will be registered by both series of the decimal-wheels, one series thus keeping an account of all the fares taken of whatever character, and the other series registering a particular character of fare.

Arranged upon one side of the table $g$ is a spool or drum, F, upon which is wound the roll of paper or ribbon upon which the fares are to be recorded or registered, said drum being supported upon a fixed axis or stud fastened to the plate C. Upon the other side of the table $g$ is disposed a receiving or winding drum, G, with one side left open, and provided interiorly with a broad flat metal spring, $j$, arranged across a slit, $j'$, in the periphery of the drum G, through which the end of the ribbon or paper slip as it is passed from the drum or spool F over the table $g$ is inserted and clamped or secured upon the inside of the drum G by said spring $j$. The receiving or winding drum G is provided at one end with a ratchet-wheel, H, from the inner side of which extends a sleeve, $l$, turning upon an axis or shaft, $l'$, secured to the plate C. The paper or ribbon $k$ after leaving the drum F, and just previously to passing upon the table $g$, passes beneath a sleeve, $m$, which is supported upon a stud secured to the plate C, and thus serves to guide the paper or ribbon exposed to a minimum friction to and upon the table.

Upon leaving the table the paper or ribbon passes through a guide or eye, $m'$, secured to that side of the table. With the ratchet-wheel H of the winding or receiving drum G engages a pawl, I, pivoted to the bar D, and caused to actuate said ratchet-wheel upon the release or return movement of either or both of the bars D D⁴ by the action of a spring, $n$, connected to the bar D and pressing against the heel end or arm of said pawl, which actuation of the said ratchet will have the effect to impart a partial rotation to said drum G, which will feed the previously-punctured paper or ribbon $k$ upon said drum.

It will of course be understood that, upon subjecting the bar or levers to a pulling action, the paper will be punctured by the pointed tooth or teeth of said lever or levers passing through said paper and the apertures of the table, by which means the fares are recorded and the character thereof indicated, a pull upon the bar D imparting a single puncture to the paper, which denotes that a fare in cash has been collected, while by pulling upon the bar D⁴, the same action upon the lever D at the same time, two punctures are made, which indicate that tickets have been received, and by the use of a third lever a record, as before stated, may be kept of transfers taken. Upon the side of the ratchet-wheel H, next to the paper or ribbon, is arranged a series of small knives or cutters, F', so disposed thereon as to effect the slitting or severing of that edge of the paper at intervals of each ten punctures, thus enabling the counting or computing of the aggregate of the punctures to be done with great facility.

The trip or half-trip registering-wheel or device in this invention differs in its details materially from that employed in my aforesaid patent, the only features in common therewith I employ herein being the numbering wheel or disk J and its depressing lever or stem K. The wheel or disk is rotatably supported upon an axis or stud, $o$, fixed to a slide or plate, K', disposed upon the front side of the plate C, or that side thereof opposite to that upon which the said wheel is arranged. Said slide is disposed in front of a longitudinal slot, $p$, made in the plate C, with its side edges lapping the plate, and its upper end bent or formed at a right angle to its body portion, and projecting rearwardly through said slot to guide said slide and to receive the depressing lever or stem K, fixed thereto, and passing through an aperture in the rim of the case A. The outer end of said stem or lever has a suitable head or disk thereon for its convenient manipulation by the hand. The stem K, with the slide K', is automatically returned to its original position after the removal of the hand or pressure therefrom by the action of a spring, $K^2$, one end of which is fastened to the plate C, while the other end thereof bears against the bent portion $k'$ of said slide. The slide K' is obliquely cut away in the direction of its length, to permit its inward movement with the recording-wheel without interference with other contiguously-disposed parts. This slide also carries a plate or bracket, $q$, arranged to slide upon that side of the plate C next to the recording-wheel J, and upon this bracket is hung the pawl $r$, whose tooth engages with a ratchet or notches in the periphery of the recording-wheel J in a plane at one side of the numbers upon said wheel, as seen in Figs. 1 and 2, the outer end of said pawl being exposed to the action of a spring, $s$, also fastened to said bent portion of the slide K', which serves to hold said wheel as against reverse movement.

L is a propelling-pawl pivoted to the plate C and held in engagement with the recording-wheel notches or ratchet by the action of a spring, $t$, with one end bearing upon said pawl, while at about its mid-length it may be coiled around a screw-threaded and headed stud inserted into the plate, to permit its other end to rest or bear against the inner side of the rim of the case A.

It will be seen that upon the depression or inward movement of the stem or lever K, which will effect the movement in the same direction of the recording-wheel, the pawl L (being relatively fixed) will slip upon the ratchet of said wheel during such movement of the wheel, permitting it to be retracted from the coincident notch of said wheel, and that upon the wheel reaching its limit of said movement the pawl L will take into the next or succeeding notch of the wheel, by which movement of the wheel the required number of said wheel will be imprinted or stamped into or upon the slip of ribbon or paper $k$, recording a trip or half-trip, after which, upon the removal of pressure or the hand from the stem K, the pawl will propel the recording-wheel or impart a partial rotation thereto, bringing the next or succeeding number into position to be impressed or stamped upon the slip of ribbon or paper upon imparting a similar movement to the stem K when it is desired to record the next trip or half-trip.

L' is a curved plate, pivotally connected to the pivot of the pawl L and carrying a pad, $l^2$, which, it will be seen, bears by the action of a spring, $l^3$, suitably secured in place upon the plate C, upon the face or numbering part of the trip-recording wheel J, and which, as said wheel is depressed or moved inward, is caused to move outward by said wheel to prevent its interference with the action of the numbering operation; but upon the return movement of said wheel its pad $l^2$ will be forced back over the lower face or numbers of the wheel, thus effecting the inking of the numbers of the said recording-wheel.

M is another pawl, which is pivoted to the slide K' near its lower end, its pivot projecting through a slot, U, in the plate C. Said pawl actuates the ratchet-wheel H when the trip-recording wheel J is used, and is held in engagement therewith by a spring, V, connected to the slide K' and bearing upon said pawl.

From the foregoing it will be seen that when inward movement is imparted to the stem K and the trip-recording wheels to record the trip or half-trip, said pawl will be carried past a number of the teeth of the ratchet-wheel H, (the pawl I in the interim serving to hold said ratchet or wheel,) and that upon the return movement of the said fare-recording wheel said pawl will, upon the limit of the aforesaid inward movement of the recording-wheel having entered the coincident notch of said ratchet-wheel, actuate or impart a partial rotation to the latter, and thus cause the winding of a portion of the slip or ribbon of paper, to leave an unpunctured space about opposite or a little to the right of the impressed trip or half-trip number, thus dividing or spacing off the fare-recording punctures of each trip or half-trip.

The back plate or cover, N, having a shallow rim, $w$, which fits inside of the rim of the case A, is locked to the latter, being adapted to that end as follows: Upon the inside of the back plate or cover, N, near its edge, is edgewise secured a small rectangular case, O, with its outer end left open and containing a tumbler, O', with its lower end resting slightly above the lower end of said case and connected to a spring, $O^2$, fastened to a separate plate or directly to said back or cover N. The upper end of said tumbler is provided with a wire projection or finger, $o'$, and is reduced, as at X, to form an offset or shoulder upon which rests one end of a bevel-ended bolt or latch, P, (see Fig. 5,) pivoted to the above-referred-to separate plate, or directly to said back or cover, and acted upon by a spring, P', suitably secured in place to said plate, the outer beveled end of said bolt or latch being arranged just opposite the opening of an open-ended slot, $y$, in the rim $w$ of the back or cover N. (See Figs. 3 and 5.) Upon the inside of the case-rim is a beveled inwardly-projecting lug, $y'$, which enters said slot $y$ of the back or cover rim, and at suitable intervals apart upon said case-rim are two other similarly-arranged lugs, Z Z, which enter additional open-ended slots Z' Z' in the cover-rim. In the case-rim, in proximity to the lug $y'$, is an opening covered by isinglass or other refrangible transparent substance, $y^2$, which is inserted in a raised socket, $y^3$, upon the outside of said rim, to effect the sealing of the back.

Q is the key, with its bit obliquely cut away at its upper corner edge, providing its opposite or lower corner edge with a point or taper, which is first inserted into the slit or keyhole $Z^2$ in the back or cover and through a coincident hole in the rectangular case O, as seen in Fig. 10.

When the cover or back is being locked, the lugs $y'$ Z will enter their slots $y$ $Z^2$ $Z^2$, and the bolt P will snap past the lug $y'$, securing the said lug together with the other lugs in a locked position in their slots, and with the key Q inserted, as shown in Fig. 10, and forced inward, when the wire or finger $o'$ will be seen through the isinglass $y^2$ at $y^3$, piercing a seal placed therein, and by retaining the key therein, and by giving the cover or back a slight turn to the left, and then withdrawing the key and again turning the cover in the same direction, this time as far as possible, the cover can be removed by pulling it bodily from the case A. Rings $Z^4$ upon the case permit the contrivance or instrument to be suspended across the shoulder by a strap passed through said rings.

The number designating the conductor having charge of the instrument may be rendered readily removable by the means for attachment of the plate upon which said number is placed, as shown in Fig. 7, which consists of a button or turn-buckle, $Z^5$, pivoted to said plate and capable of being passed through the slot $Z^6$, with a circular center in the front of the case A, and then turned, as shown, at right angles to the length or greater axis of said slot.

A spring, $n'$, fastened to the inner side of the cover N, bears against and holds in place the feed-roll or drum F when the cover is in position.

The case A comprises the front plate, R, which is formed with the rim R' at its edges or circumference, and with a serially-apertured hemispherical bulb or supplementary chamber, $R^2$, at its center, to inclose the bell or gong B, the apertures in said bulb permitting the better transmission of the sound of the bell or gong.

Modifications in details of construction and form, and proportion of parts herein shown and described as an embodiment of my invention, may be made without departing from the principle or sacrificing the advantages thereof, and I would therefore have it understood that I hold myself at liberty to make such changes and alterations as fairly fall within the principle or scope of my invention.

Having thus fully described my invention, what I claim, and desire to secure by Letters Patent of the United States, is—

1. In a fare-register, the combination, with the apertured table which receives the fare slip or ribbon, of the bars, each carrying a pointed tooth or pin depending therefrom and overhanging the table, one of said bars having independent action and the other bar arranged for coaction with the independently-acting bar, substantially as and for the purpose set forth.

2. In a fare-register, the combination, with the ribbon, the fare slip or ribbon puncturing-bar provided with a pawl, of the gong or bell, the hammer-arm of said gong carrying a cam engaged by said automatically-actuated pawl of said bar, said bar also having a pawl to actuate the ribbon-receiving roll or drum ratchet upon the release or return movement of said bar, and the ribbon-receiving roll provided with a ratchet, substantially as and for the purpose described.

3. In a fare-register, the combination, with the fare-slip puncturing-bar, of the gong or bell, said bar having a primary pawl, and the supplementary spring-pawl acting upon the primary pawl, the latter pawl actuating the ribbon-receiving roll or drum ratchet upon the release or return movement of the said bar, and the hammer-arm of said gong or bell having a cam actuated by said primary pawl of the bar, substantially as and for the purpose described.

4. In a fare register, the combination, with the fare-puncturing bar carrying the automatically-operating pawl, of the gong or bell, its hammer-arm provided with a cam, the tripping-stop for said pawl, and the two rolls, the ribbon, and the table or plate, substantially as and for the purpose specified.

5. In a fare-register, the fare-slip puncturing bar carrying a post or stud, in combination with the decimal-wheel, a pivoted arm carrying a rod or axis, and a pawl hanging upon said axis, the pivoted arm being provided with a crank having connection with said stud or post of the lever, substantially as and for the purpose specified.

6. In a fare-register, the fare-puncturing bars, one having independent action, and the other coacting with the independently-acting bar, and each bar carrying a stud or post, in combination with the duplicate decimal ratchet-pawls, each hung upon a rod or axis of pivoted arms, said arms having cranks provided with trunnions or pivots bearing in said studs or posts of the bars, substantially as and for the purpose described.

7. The combination, with the case having spaced-apart lugs upon the inside of its rim, of the back plate or cover having open-ended slots in its rim, and the bolt or latch pivoted and acted upon to snap past one of said lugs, substantially as and for the purpose set forth.

8. The combination, with the case having upon the inside of its rim spaced-apart lugs and a sealed aperture, of the back plate or cover having open-ended slots in its rim and a spring bolt or latch with its inner end entering a slotted case containing a tumbler acting upon said bolt or latch to unlock it, and carrying a finger or projection entering the sealed aperture of the case, substantially as and for the purpose set forth.

In testimony whereof I affix my signature in presence of two witnesses.

HOLMES MARSHALL.

Witnesses:
F. E. DELLENBURGH,
A. J. BRENNAN.